United States Patent [19]

Glessner et al.

[11] Patent Number: 4,905,247

[45] Date of Patent: Feb. 27, 1990

[54] HIGH POWER TUNABLE INFRARED MIRRORLESS LASER

[75] Inventors: John W. Glessner, Kirkland ABF, N. Mex.; Steven J. Davis, Londonderry, N.H.; Leonard Hanko, Rio Rancho, N. Mex.

[73] Assignee: The United States of America as represented by the Secretary of the Air Force, Washington, D.C.

[21] Appl. No.: 242,399

[22] Filed: Sep. 9, 1988

[51] Int. Cl.$^4$ ............................................. H01S 3/22
[52] U.S. Cl. ...................................... 372/55; 372/34; 372/92
[58] Field of Search ................. 372/89, 55, 34, 33, 372/92

[56] References Cited

U.S. PATENT DOCUMENTS

| | | | |
|---|---|---|---|
| 3,307,113 | 2/1967 | Hughes | 330/4.3 |
| 3,519,949 | 7/1970 | Malnar et al. | 331/3 |
| 3,842,364 | 10/1974 | Srinivasan | 331/94.5 |
| 4,318,060 | 3/1982 | Davis | 372/70 |
| 4,350,661 | 9/1982 | Davis et al. | 422/98 |
| 4,421,408 | 12/1983 | Davis et al. | 356/246 |
| 4,467,474 | 8/1984 | Davis et al. | 372/89 |
| 4,488,311 | 12/1984 | Davis et al. | 372/89 |

OTHER PUBLICATIONS

Glessner et al, "Multilevel Cooperative Amplified Spontaneous Emission from the $I_2$ (B-X) System," J. Appl. Phys., 62, 5-10, 1987.
Glessner et al, "Amplified Spontaneous Emission from the (B-X) System in $I_2$," Digest of Technical Papers OSA/IEEE, May 21, 1985.
Hanko et al, "Observation of Superfluorescent Emission of the B-X System in $I_2$," Optics Communications, 30, 63-65, Jul. 1979.

Primary Examiner—Leon Scott, Jr.
Attorney, Agent, or Firm—Donald J. Singer

[57] ABSTRACT

The invention comprises a mirrorless iodine laser having an elongated sealed iodine cell for both receiving and emitting laser energy. A pumping laser is used for projecting a laser beam into the sealed cell along its long axis in order to excite the iodine molecules within the cell and cause their release of laser energy. A heater is used for heating the sealed cell to a temperature that increases the amplified spontaneous emissions (ASE) of the iodine in the sealed cell when it is excited by the pumping laser.

19 Claims, 2 Drawing Sheets

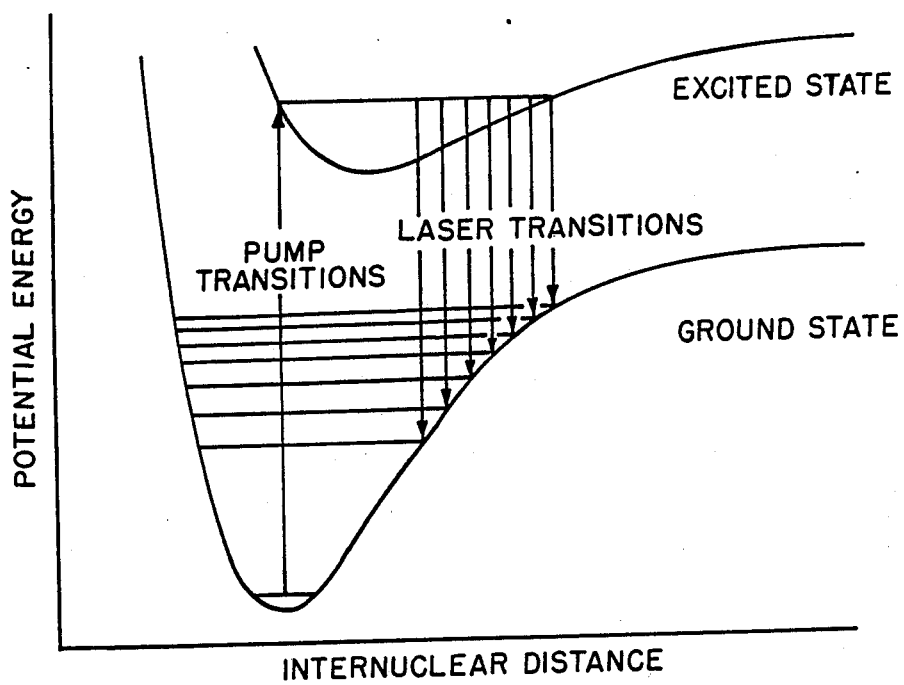
FIG. 2 OPTICAL PUMPED LASER MOLECULAR TRANSITIONS.
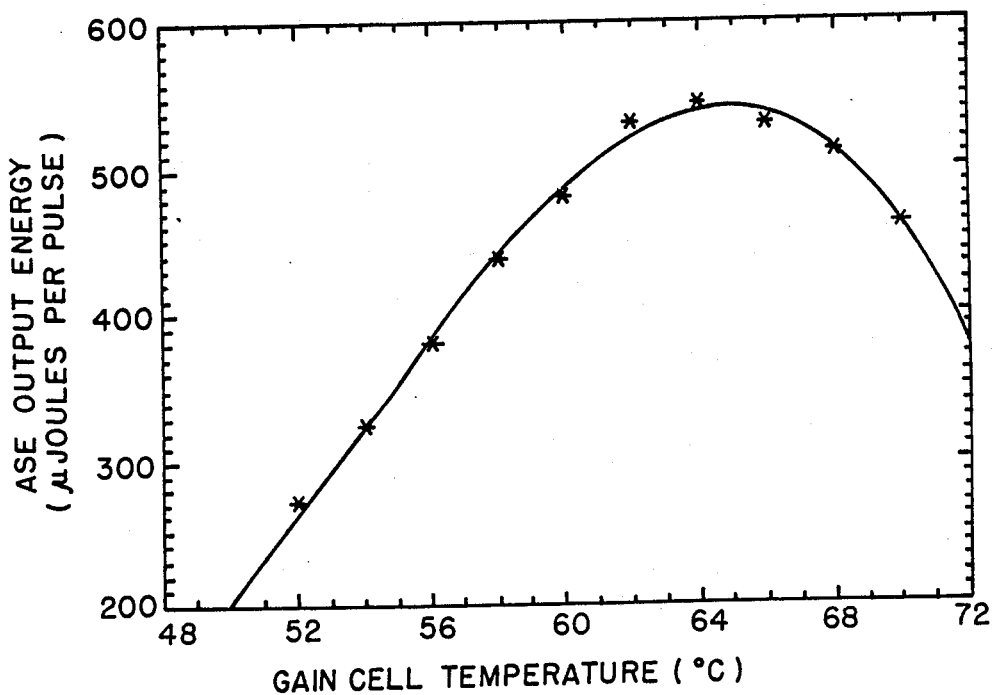
FIG. 3 ASE OUTPUT ENERGY VERSES TEMPERATURE.

HIGH POWER TUNABLE INFRARED MIRRORLESS LASER

STATEMENT OF GOVERNMENT INTEREST

The invention described herein may be manufactured and used by or for the Government for governmental purposes without the payment of any royalty thereon.

BACKGROUND OF THE INVENTION

This invention relates to lasers and particularly to molecular iodine lasers that emit in the near infrared range.

There has been considerable recent interest in both atomic and molecular iodine lasers in the past few years. Optically pumped iodine lasers have been investigated and reported in the literature. Iodine lasers offer tunable output from approximately 544 to 1350 nm and have been operated in both pulse and continuous wave (cw) modes of operation.

Although the iodine molecule ($I_2$) is one of the most thoroughly studied diatomic species with numerous spectroscopic and data studies available, amplified spontaneous emission of iodine (B→X) has only recently been studied in detail. In our paper entitled "Multilevel Cooperative Amplified Spontaneous Emission from the $I_2$(B→X) System" published in the Journal of Applied Physics, vol 62 (1), 1 July 1987 we reported our most recent experiments with amplified spontaneous emission (ASE) in iodine ($I_2$). These experiments utilize a YAG-laser pumped dye laser system as an excitation source for an iodine filled cell. Amplified spontaneous emission (ASE) was detected and measured in the near infrared spectra from the iodine cell. Unfortunately, the quantum efficiency of ASE conversion was only in the area of 1 percent.

An iodine ASE device could prove to be a simple and efficient frequency shifter for a pulsed dye laser if the ASE quantum efficiency could be improved. Since the emission occurs in the spectral range of 1.0–1.34 microns, such a device could compete with hydrogen-Raman shifters. Higher efficiencies for the conversion of visible dye laser photons to near infrared photons would make the device an important tool for spectroscopic studies including chemical analysis and meteorology.

An iodine ASE device would be much less expensive to manufacture and easier to use than the conventional hydrogen-Raman shifters. This is because hydrogen shifters require high pressure steel containment cells with thick windows. Unfortunately, the iodine device which we have studied in the above-referenced paper was not capable of emitting sufficient energy to be a useful tool.

A need therefore exists for an improved iodine ASE laser capable of extended pulsed or continuous wave (CW) operation at sufficient power to be a useful spectroscopy tool.

A need also exists for a low cost tunable iodine laser which does not require expensive high precision components.

SUMMARY OF THE INVENTION

The invention comprises a mirrorless iodine laser having a elongated sealed iodine cell for both receiving and emitting laser energy. A pumping laser is used for projecting a laser beam into the sealed cell along its long axis in order to excite the iodine molecules within the cell and cause their release of laser energy. A heater is used for heating the sealed cell to a temperature that increases the amplified spontaneous emissions (ASE) of the iodine in the sealed cell when excited by the pumping laser.

In the preferred embodiment of the invention, the pumping laser comprises a dye laser. The dye laser and the sealed cell are positioned such that the optical axes of the dye laser and the lasing cavity (sealed cell) coincide. The dye laser, or pumping laser, beam is directed into the sealed cell to accomplish what is termed longitudinal pumping of the iodine vapor in the laser cavity. The iodine is thereby excited which results in amplified spontaneous emissions from the iodine in the near infrared wavelengths.

A further aspect of the preferred embodiment is the operation of the mirrorless iodine laser at a preferred temperature between 50° and 77° C. Use of the heater to heat the iodine cell to this preferred temperature range has resulted in suprising and unexpected large increases in the quantum efficiency of the ASE conversion during operation of the mirrorless iodine laser. The output energies of the heated sealed cell iodine laser are an order of magnitude higher than was possible at room temperature.

In the preferred embodiment of the invention, the pumping laser projects a laser beam at a preselected wavelength in the range of 500–610 nm which is shorter than the desired wavelength of iodine emission. Typically the iodine sealed cell will emit in the range of 600 to 1340 nm. As a result, a long pass filter can be used with mirrorless iodine laser for separating laser light emitted by the iodine from the shorter wavelength light of the pumping laser.

Finally, it is preferred that the sealed cell be constructed between 0.05 and 4.0 meters long. The product of the iodine pressure in the cell times the length of the cell is preferably greater than 19 Torr-cm.

An object of this invention therefore is to provide a mirrorless iodine laser with sufficiently good performance for use as a visible to near-infrared wavelength converter for a variety of spectroscopic uses.

It is a further object of this invention is to provide an efficient low cost tunable laser which does not require high precision optical components.

An advantage of this invention is that the mirrorless iodine laser is totally unhindered by external devices such as caused by wavelength dependence on mirror reflectivity, etalons, gratings or cavity geometry. It is advantageous that this ASE mirrorless laser permits fundamental spectroscopic and kinetic studies of mediums without external optical complications.

BRIEF DESCRIPTION OF THE DRAWINGS

The foregoing and other objects and advantages of the invention will be apparent from the following more particular description of the preferred embodiment of the invention, as illustrated in the accompanying drawing, in which like reference characters refer to the same parts throughout the different views. The drawings are not necessarily to scale, emphasis instead being placed upon illustrating the principles of the invention.

FIG. 2 is a graph showing optical pumped laser molecular transitions; and

FIG. 3 is a graph of ASE output energy versus temperature.

DETAILED DESCRIPTION OF THE INVENTION

Figure 1:
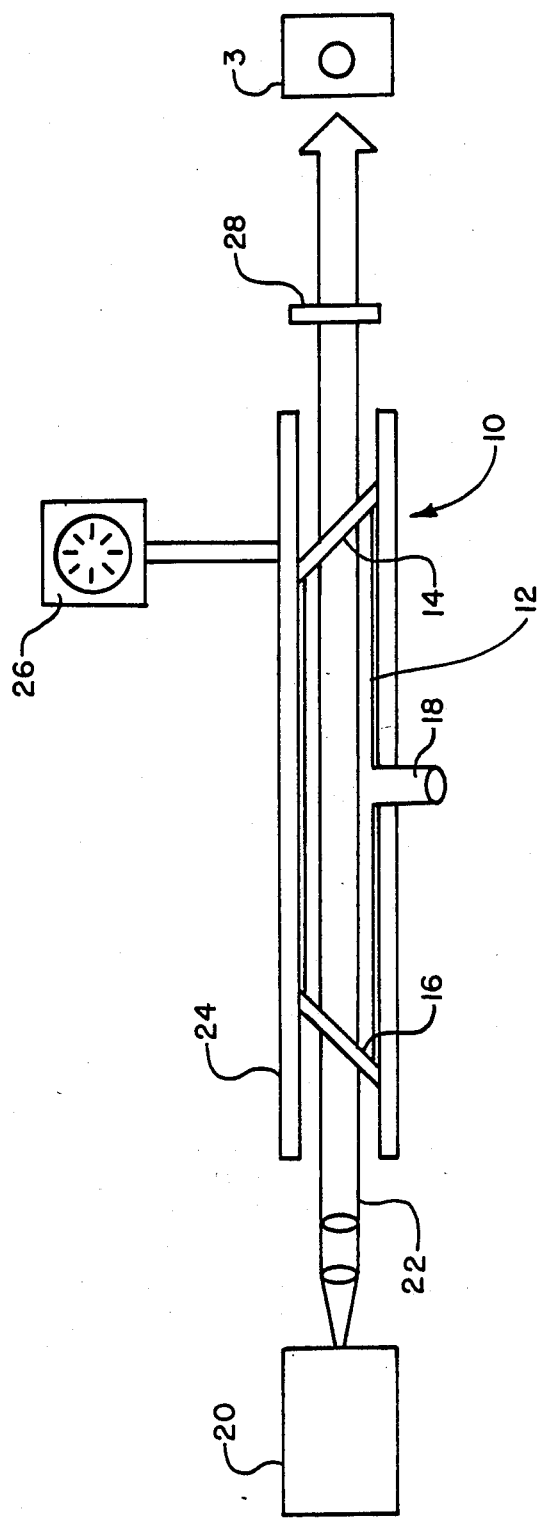
FIG. 1 is a schematic representation of an iodine ($I_2$) laser which incorporates the principles of this invention.

FIG. 1 shows a mirrorless iodine laser 10 constructed according to the principles of this invention. The heart of the iodine laser comprises an elongated sealed cell 12 of pyrex glass which is closed at opposite ends by Brewster windows 14 and 16. The sealed cell forms a lasing cell or cavity containing iodine vapor which is replenished from an iodine reservoir 18. The cell is typically evacuated except for the iodine vapor which can be controllably admitted to the lasing cavity by means of a valve that can be interposed between the reservoir 18 and the sealed cell 12.

Preferably, the sealed cell is between 50 and 400 centimeters in length and between 10 and 20 millimeters in diameter. Iodine gas pressure within the cell is preferably between 100 and 400 mTorr. In actual practice, the cell is evacuated to about $10^{-3}$ Torr then filled with the iodine vapor at room temperature to a vapor pressure of approximately 300 mTorr in order to achieve a suitable iodine vapor equilibrium.

A pulsed dye laser 20, which acts as the pumping laser, is positioned with the sealed cell 12 such that the optical axes of the dye laser and the lasing cavity coincide. The dye laser beam is directed into the sealed cell to accomplish longitudinal pumping of the iodine vapor in the laser cavity. Typically, the laser beam 22 emitted by the pulsed dye laser is linearly polarized. The beam is transmitted through Brewster window 16 in order to maximize beam strength entering the sealed cell 12. Brewster angle windows, as is well known, produce very low reflection loss so that virtually all the pumping energy is transmitted into the sealed cell. Similarly Brewster window 14 allows all of the amplified spontaneous emission of the iodine in the cell to be transmitted out of the cell along the longitudinal axis.

A variety of lasers can be used as the pumping laser. We have chosen in our work two pulsed dye lasers that enable us to generate the entire desired spectrum for exciting the iodine cell. Specifically, the desired pulsed dye laser spectrum is from 500-610 nm. This is because wavelengths 500 nm or lower would cause disassociation of the iodine diatomic molecule while beams above 610 nm would not introduce enough energy to move the iodine molecules to their excited state (due to the low frequency of the transmitted energy). Laser beams outside this waveband would therefore not be suitable for exciting the mirrorless iodine laser.

Although a variety of pump laser sources could be used, we have used two specific devices to provide tunable radiation to the iodine cell. Our primary source was a Quanta-Ray Nd:Yag pumped dye laser system. The 1064 nm output from the Q-switched Nd:Yag (DCR-1) was frequency doubled to 532 nm or tripled to 353 nm using potassium dihydrogen phosphate (KDP) in a harmonic generator (HG-1). A prism harmonic separator (PHS-1) dispersed the output from the harmonic generator, allowing only the desired wavelength to pump the dye laser (PDL-1). The dye laser consisted of an oscillator-amplifier combination with wavelength selection via a stepping motor controlled grating. Various dyes were used depending on the wavelength coverage desired. This dye laser system produced 10 ns pulses (FWHM) at a 10 Hz rate. The linewidth was 0.5 $cm^{-1}$ as measured with a Fabry-Perot spectrum analyzer. The dye laser output was generally below 20 mJ per pulse and typically in the range of 1 to 5 mJ depending on the dye used. Secondarily, a Phase-R DL 1400 flashlamp pump dye laser was also used to generate 200 nanosecond (ns) pulses at a typical pulse rate of 0.1 Hz.

The sealed iodine cell can be manufactured in a variety of different ways and the length of the laser cavity can be varied depending on the particular usage. Cells as small as 5 centimeters or as large as 4 meters can be constructed and used. We have actually used two cells in developing this laser. A cell of pyrex glass tube having a 13 mm diameter was joined using O-ring connectors to ensure vacuum tightness. The cell length was varied from 20 to 400 centimeters. We have also constructed a 0.98 cm long cell which could not be varied in length. The product of the cell length times the iodine pressure within the cell must be at least 19 Torr-cm in order to produce good results. We believe this to be the minimum product value for an efficient iodine mirrorless laser, however, we have not yet explored the limit of the product value.

The sealed cell 12 is surrounded and substantially enveloped by a heater 24 capable of heating the cell to a desired 50°-72° C. range. The heater can take several forms; in our preferred embodiment, however, it was constructed from a 2 inch diameter copper tube which was 130 centimeters long and wrapped with flexible heat tape. The temperature in the cell was controlled by varying AC power to the heat tape with a variac-type temperature control 26. A small hole in the pipe (not shown) allowed use of an alumel-chromel thermocouple which was put in contact with the glass cell to measure cell temperature. The thermocouple temperature was used to calculate iodine pressure within the cell. This is explained in greater detail in the dissertation of Capt. John W. Glessner which is entitled "Amplified Spontaneous Emission of the Iodine System" and was deposited at the Air Force Institute 25 of Technology, Wright Patterson AFB, in Dayton, Oh. This dissertation is hereby expressly incorporated by reference.

A long pass filter 28 was used to filter the output of the iodine cell and specifically to separate the iodine ASE beam from the pump beam of pulsed dye laser 20. It should be noted, however, that no detectable pump beam through transmission has been observed during operation of the preferred embodiment of this device.

The output of the iodine cell is tuned by adjusting the wavelength of the pulsed dye laser 20. Changing the wavelength of the input laser results in a changed output wavelength. It was possible with this device to vary the wavelength of the iodine laser from 600 to 1340 nm. The device, however, is most efficient and would probably be most useful in the wavelength range of 1.0 to 1.34 microns (1000-1340 nm).

Detection of the laser output of the iodine cell can be done with a variety of detection devices. One preferred device is the Opto Electronics PD-20 germanium photodiode 30 which has a rise time of less than 1 ns.

Optical pumping with lasers have numerous advantages over other sources (flashlamps, arc lights, atomic lamps). These include high pump powers, narrow spectra bandwidth, wavelength tunability and both pulsed and continuous wave operation. The fundamental operating principle of an optically pumped laser such as that described herein, is shown by the potential energy curve of FIG. 2. A fraction of the ground state thermal population of iodine is optically pumped to the excited state where population inversion is created relative to the thermally unpopulated high lying vibrational levels of the electronic ground state. If a sufficient population is excited and the gain is high enough to overcome losses (radiative and collisional) then lasing is achieved. Because of gain competition among the many radiative transitions and threshold population requirements, the intensity of the laser lines may only approximately follow the Franck-Condon transition intensity factors. The use of lasers as optical pumping sources allows single, selective energy levels to be populated which greatly simplifies the emission spectrum.

In the device described herein we consider a gain system contained in the optical cavity of the iodine sealed cell. This system has sufficiently high gain, such that optical feedback is not necessary to reach the lasing threshold in which spontaneous emission noise is amplified through stimulated emission. This mirrorless lasing relies on amplified spontaneous emission which has been previously observed for iodine ($I_2$) and bromine ($Br_2$).

We will now discuss laser emission or amplified spontaneous emission (ASE) from our optically pumped iodine cell and show that when the iodine cell was heated above room temperature a dramatic increase in ASE output power resulted. This increased power permits the development of a useful laser having acceptable quantum efficiencies. Molecular optically pumped lasers such as that described herein are most valuable in three general areas of exploration spectroscopy, kinetics and new laser devices.

In tests of an unheated optically pumped iodine system we have found that ASE output is linearly dependent on intensity. Results on a cell having iodine pressure of 200 mTorr show that ASE output levels off at pump energies of about 10 mJ/pulse. This indicates that the pump transition for the ASE is saturated. With no more molecules available for pumping, ASE output no longer increases with pump energy. Experiments have shown that only 35% of the pump energy was actually absorbed by the iodine gas molecules. This fraction is nearly constant over the pump range of 2 to 25 mJ input intensity.

Using the above results, the ASE conversion efficiency of an unheated mirrorless iodine laser was calculated. In the case where pump input was at saturation, output quantum efficiency was found to be 0.7%. An in depth discussion of this calculation can be found in the above-referenced dissertation of Capt. John W. Glessner.

In an effort to increase ASE output intensity and efficiency the vapor pressure of iodine was raised by heating a 98 centimeter sealed cell with the heater previously described. By raising the vapor pressure, the number of molecules is increased and the percentage of pump energy absorbed is increased as the cell becomes optically dense. While both of these effects might be expected to increase the inversion intensity, only a marginal increase in gain was expected. FIG. 3 shows the spectacular increase in ASE output versus temperature that was achieved. The output energies plotted in FIG. 3, indicate an order of magnitude increase in output energy over the room temperature results described above. For this embodiment, the ASE energy peaked at 65° C. and then decreased with increasing temperature. This could be due to collisional losses greatly increasing at high number densities and to insufficient pump energy to achieve a population inversion over the entire gain length. We believe that the high temperature ASE output of the device as tested was pump energy limited and that ASE output increases linearly with pump energy. Clearly, the heated cell ASE laser yields far greater performance than the room temperature mirrorless ASE laser.

The heated cell device of this invention achieved a peak energy of 0.55 millijoules at 72° C. This corresponds to about 10 kWatts in a 55 nanosecond pulse. A quantum efficiency of 8.3% has also been demonstrated. Referring back to the unheated system above, it can be seen that the quantum efficiency of the cell is over an order of magnitude greater than that of the unheated device.

Surprisingly, we have found that this heated cell optically pumped mirrorless laser works quite well with broadband pump lasers. Decreasing the pump spectral linewidth results in a decrease in a ASE output. It appears that fewer rotational levels are pumped in the iodine resulting in less cooperative stimulated emission (CSE) intensity with a smaller bandwidth pump.

Cooperative stimulated emission results when several adjacent rotational levels of the excited state (of iodine molecules) are simultaneously populated via the optical pumping. Individually these energy levels may have insufficient population to exceed the ASE threshold. Their emission frequencies, however, are coincident, so these discrete levels contribute photons to a common radiation field. The stimulated emission intensity is thereby enhanced. This system of levels acts as a "super level" with a population that is the sum of the individual levels. This super population, being well above ASE threshold, results in strong ASE being observed. One can say that the levels cooperate in the stimulated emission at a common frequency. The process described above is defined as cooperative stimulated emission (CSE). In contrast to conventional pumped laser cavities the laser of this invention is unusual because broad bandwidth pump lasers are preferred over narrow bandwidth pump lasers. For the best CSE performance the pump laser should be as wide as the manifold of transitions that excite the complete super level. This bandwidth can be very wide and can vary from 4 to 25 angstroms.

The laser is tuned by changing the wavelength of the pump laser. Adjusting the input wavelength coming from the pump laser 20 produces a wavelength range of 600 and 1340 nm in the emission of the iodine cell. At this time it would appear that the most efficient and useful wavelength range would be in the near infrared region of 1.0 to 1.34 microns. A summary of the ASE transitions listing the input wavelength of the pulse dye laser 20 and the output of the mirrorless iodine laser can be found in table I below.

TABLE I

Summary of ASE Transitions

| Excitation Wavelength (Å) | Emission Wavelength (Å) | Excitation Wavelength (Å) | Emission Wavelength (Å) |
|---|---|---|---|
| 6041.0 | 10647 | 5617.1 | 12155 |
|  |  |  | 12337 |
| 6005.5 | 10519 | 5588.0 | 12384 |
|  | 10695 |  | 12567 |
| 5970.9 | 10755 | 5560.2 | 12426 |
|  | 10935 |  | 12608 |
| 5944.4 | 11008 | 5535.2 | 12653 |
|  | 11200 |  |  |
| 5889.6 | 11027 | 5506.9 | 12689 |
|  | 11220 |  | 12865 |
| 5855.0 | 11271 | 5482.2 | 12727 |

TABLE I-continued
Summary of ASE Transitions

|        | 11455 |        | 12903  |
|--------|-------|--------|--------|
| 5821.1 | 11323 | 5457.7 | 12767  |
|        | 11507 |        | 12935  |
|        | 11699 |        |        |
| 5774.8 | 11541 | 5434.6 | 12976  |
|        | 11728 |        |        |
| 5747.2 | 11787 | 5411.8 | 13008  |
|        | 11975 |        |        |
| 5708.6 | 11823 | 5389.8 | 13038  |
|        | 12013 |        |        |
| 5672.5 | 12059 | 5368.6 | 13070  |
|        | 12447 |        | 13220  |
| 5647.0 | 12107 | 5348.1 | 13099  |
|        | 12294 |        | 13246  |

| Excitation Wavelength (Å) | Emission Wavelength (Å) |
|---|---|
| 5328.6 | 13268 |
| 5309.6 | 13289 |
| 5291.5 | 13308 |
| 5274.1 | 13326 |
| 5257.3 | 13343 |
| 5241.1 | 13359 |
| 5225.9 | 13372 |
| 5211.4 | 13385 |
| 5197.6 | 13390 |
| 5184.3 | 13395 |
| 5172.5 | 13401 |
| 5165.2 | 13402 |
| 5154.0 | 13412 |
| 5149.7 | 13414 |

This invention acts as a simple, efficient, high power, discretely tunable wavelength converter from visible to infrared. No careful alignment of mirrors or focusing optics is required in the device. Further, no special gas handling system is needed. There is no other currently available, simple, efficient, tunable and high power near infrared laser. This invention meets all the criteria in a simple and inexpensive system.

A main use of this invention is for spectroscopic study, for example, as a diagnostic probe laser in the near infrared for chemically pumped laser research. Further, the invention can be used to detect water vapor in meteorology and space studies. The invention is simple to operate and can greatly enhance diagnostic studies in molecular spectroscopy. These practical applications stem from the invention's use as a simple discretely tunable wavelength converter.

While the invention has been particularly described with reference to the preferred embodiment thereof, it will be understood by those skilled in the art that various changes in substance and form can be made therein without departing from the spirit and the scope of the invention as described in the appended claims.

We claim:

1. A mirrorless iodine laser comprising:
   (a) an elongated sealed cell having a long axis and which contains iodine;
   (b) a pumping laser for projecting a laser beam into the sealed cell along its long axis in order to cause said iodine to lase; and
   (c) a heater means for heating said sealed cell to a temperature that increases amplified spontaneous emissions from said iodine in said sealed cell wherein iodine laser emissions propagate primarily along the long axis of the sealed cell.

2. The mirrorless iodine laser of claim 1 wherein the sealed cell is heated to between 50 degrees and 77 degrees C.

3. The mirrorless iodine laser of claim 1 wherein the pumping laser projects a laser beam at a wavelength preselected to cause said iodine to lase at a desired wavelength.

4. The mirrorless iodine laser of claim 1 further comprising a long pass filter for separating laser light emitted by the iodine from shorter wavelength light.

5. The mirrorless iodine laser of claim 1 wherein the pumping laser projects a laser beam at a preselected wavelength which is shorter than the desired wavelength of iodine emission.

6. The mirrorless iodine laser of claim 5 wherein the pumping laser emits in the range of 500 to 610 nm.

7. The mirrorless iodine laser of claim 6 wherein the iodine sealed cell emits in the range of 600 to 1340 nm.

8. The mirrorless iodine laser of claim 1 wherein the sealed cell is between 0.05 and 4.0 meters long.

9. The mirrorless iodine laser of claim 1 wherein the product of iodine pressure in the sealed cell and the length of the sealed cell is greater than 19 Torr-cm.

10. The mirrorless iodine laser of claim 1 wherein the sealed cell further comprises an iodine reservoir.

11. The mirrorless iodine laser of claim 1 wherein the sealed cell further comprises brewster angle windows at each end of the sealed cell for reducing reflection losses of the laser beam entering the sealed cell from the pump laser and of the laser emissions of the iodine leaving the sealed cell.

12. The mirrorless laser of claim 1 wherein the heater substantially envelopes the sealed cell.

13. A mirrorless iodine laser comprising
   (a) an elongated sealed cell comprising an iodine reservoir and having a long axis;
   (b) a pumping laser for projecting a laser beam into the sealed cell along its long axis in order to cause said iodine to lase, wherein the pumping laser projects a laser beam at a preselected wavelength which is shorter than the desired wavelength of iodine laser emissions; and
   (c) a heater for heating said sealed cell to between 50 degrees and 77 degrees C. in order to increase amplified spontaneous emissions from said iodine in said sealed cell and wherein said iodine laser emissions propagate primarily along the long axis of the sealed cell.

14. The mirrorless iodine laser of claim 13 further comprising a long pass filter for separating laser light emitted by the iodine from shorter wavelength light.

15. The mirrorless iodine laser of claim 13 wherein the pumping laser emits in the range of 500 to 610 nm.

16. The mirrorless iodine laser of claim 15 wherein the iodine sealed cell emits in the range of 600 to 1340 nm.

17. The mirrorless iodine laser of claim 15 wherein the sealed cell is between 0.05 and 4.0 meters long.

18. The mirrorless iodine laser of claim 15 wherein the product of iodine pressure in the sealed cell and the length of the sealed cell is greater than 19 Torr-cm.

19. The mirrorless iodine laser of claim 15 wherein the sealed cell further comprises an iodine reservoir.

* * * * *